Nov. 5, 1957   R. B. JACOBS   2,811,851
CONTINUOUS LIGHT ENDS RECORDER
Filed Oct. 19, 1954   3 Sheets-Sheet 1

INVENTOR.
Robert B. Jacobs.
BY Everett A. Johnson
Attorney.

INVENTOR.
Robert B. Jacobs.
BY Everett A. Johnson
Attorney.

United States Patent Office 2,811,851
Patented Nov. 5, 1957

2,811,851

CONTINUOUS LIGHT ENDS RECORDER

Robert B. Jacobs, Homewood, Ill., assignor to Standard Oil Company, Chicago, Ill., a corporation of Indiana Application October 19, 1954, Serial No. 463,171

8 Claims. (Cl. 73—53)

The invention relates to an improved apparatus and method for automatically determining volatility characteristics of liquids.

In the blending of gasoline, among the primary specifications to be maintained are those defining its front end volatility. These include the Reid vapor pressure and the percentage distilled under carefully controlled temperature conditions.

The distillation characteristic is determined according to the ASTM Test D86–52 wherein the gasoline being tested is evaporated under carefully controlled conditions and the volumes evaporated at different temperatures are noted. For example, the volatility specification may state the limits of the percentage which will have distilled off when a temperature of 158° F. has been reached. This specification, called the "percent 158" for short, has different ranges corresponding to seasonal gasoline variations. Although the ASTM test is a desirable specification, the test is a time-consuming operation which does not lend itself to routine or widespread use for product and process control.

Gasolines are now marketed under specifications based on the Reid method for vapor pressure determination (ASTM D323–52). This method employs an apparatus comprising an air chamber, a Bourdon-type pressure gauge, and a liquid sample chamber. The air chamber has fixed dimensions and openings designed to permit complete drainage of the chamber. The liquid sample chamber has the same inside diameter as the air chamber and a length sufficient to provide an overall vapor to liquid ratio of 3.8 to 4.2 when attached to the air chamber. In determining vapor pressure with this apparatus, the sample liquid, having first been chilled, is introduced into the sample chamber which is then affixed to the air chamber. The assembled apparatus is shaken vigorously and immersed in a water bath maintained at a constant temperature (100°±0.2° F.) until the pressure reaches equilibrium. This system provides reasonably accurate results although it is a slow procedure requiring refrigeration of the sample and then around half an hour or more for each determination even when carried out by a skilled operator.

The rapidity of the blending operation wherein thousands of gallons of gasoline are blended every hour requires a system which can give rapid and accurate information as to whether the gasoline being blended will pass the above specifications.

It is, therefore, an important object of the present invention to provide an apparatus for use in rapidly and continuously determining the front end volatility characteristics of a blended gasoline. Another object of the invention is to provide an apparatus for automatically and continuously providing data from which the nature and content of a blended gasoline may be determined in a routine and fool-proof manner for product and process control. A further object of the invention is the provision of an improved venting capillary system which has reproducible characteristics. Still another object of the invention is to provide an apparatus for obtaining data which corresponds to data obtained by ASTM Test D86–52. These and other objects of the invention will become apparent as the description thereof proceeds.

The vapor pressure of gasolines may be rapidly and automatically determined by withdrawing a sample at a constant rate of flow, preheating the sample, and introducing it into a vaporizing chamber maintained within a constant temperature bath. A capillary vent leads from the vaporizing chamber to the atmosphere to continuously bleed off vapor and air. A free surface of liquid is maintained within the vaporizing chamber and the pressure within the vented chamber is proportional to the vapor pressure of the liquid at the temperature of the constant temperature bath.

Embodiments of apparatus for making such vapor pressure determinations are described and claimed in co-pending application S. N. 368,184, filed July 15, 1953, entitled "Continuous Volatility Determination," and now U. S. Patent 2,782,628.

I have devised an instrument which records continuously the "percent 158" of the gasoline sample. Briefly, it comprises a constant temperature bath containing a vented float chamber to which is fed, at a constant rate, the gasoline being tested. Pressures developed in the float chamber are then correlated by means of a calibration chart with the percentage evaporated at 158° F. according to ASTM Test D86–52.

A preferred embodiment of my invention will be described in connection with the accompanying drawings wherein.

Figure 1:
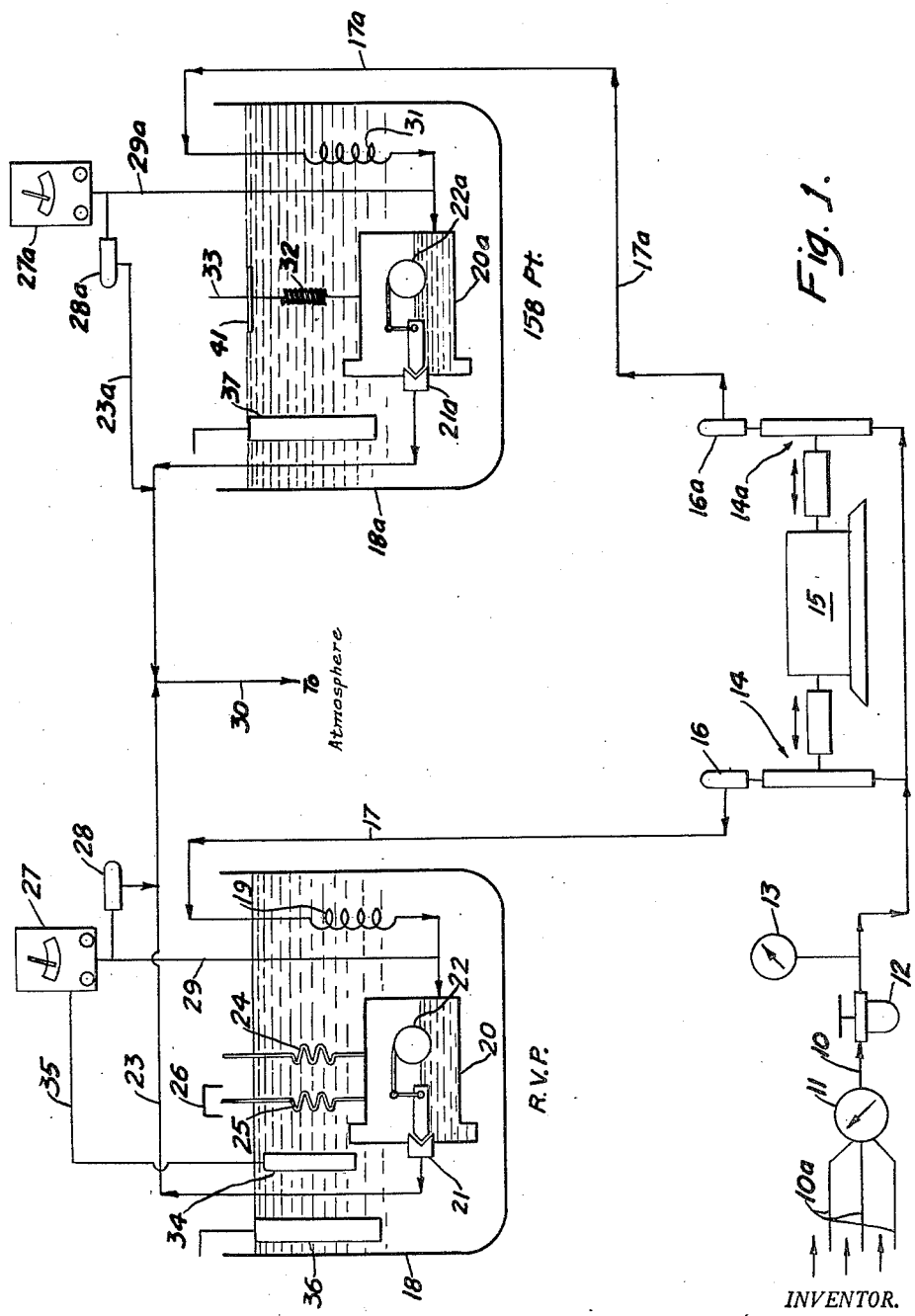
Figure 1 is a diagrammatic sketch of an apparatus according to the invention and including a Reid vapor pressure determinator section and a percent distillation section.

Referring to Figure 1, a gasoline blend from one of product lines 10a is introduced via selector valve 11 and passed into sample line 10 which is provided with a filter 12 and a feed line pressure indicator 13. The sample is pumped at a uniform rate by the first side 14 of pump 15 through the check valve 16 and into the vapor pressure apparatus in constant temperature bath 18 via line 17 having preheater coil 19. The check valve 16 may comprise a Henry pressure relief valve set at 120 p. s. i. which functions as a spring loaded check valve to prevent flow directly through the pump 15 without metering.

The liquid sample, pumped at a rate of about 60 cc. per minute, flows via line 17 through the preheating coil 19 disposed within the constant temperature bath 18. The preheating coil may comprise a stainless steel tubing about 8 feet long and having an I. D. of about 0.085 inch. In flowing through the preheating coil 19, the temperature of the liquid is raised to a temperature which is in substantial equilibrium with the temperature of the oil bath 18.

For gasolines having Reid vapor pressures in the range of 6 to 20 pounds, the oil bath temperature is maintained in the range of between about 135° and about 145° F., the temperature selected being high enough to insure that the vapor pressure of the liquid under test will always be greater than atmospheric. However, it is preferred in determining the vapor pressure characteristics to use a temperature of about 140° F. since at that temperature the effect of the composition of blends on the pressure within the float chamber 20 is minimized if vented at a proper rate.

Any means, shown schematically at 36, for controlling the bath temperature may be used. However, one means 36 for effecting such control is to provide a constant temperature bath 18 having an insulated vessel with a coil heater which is controlled by means of a thermoswitch. The thermoswitch may be connected to a suitable relay whereby current is supplied to the heater in response to changes in the temperature of the bath as sensed by the thermoswitch.

The preheated sample flows as a liquid from the coil 19 into the vapor chamber 20 in which a constant level of sample liquid is maintained by float 22. Excess liquids flow from the chamber 20 by means of the outlet line 23, which line is controlled by the float valve 21. A pressure transmitter 27 is in pressure communication with the chamber 20 via impulse line 29 connected to liquid line 17 which discharges into chamber 20.

Communicating with the vapor space of the float chamber 20 is a vent capillary system 24—25 which bleeds vapors and fixed gases, such as air, from the float chamber 20. A pair of capillary means 24 and 25 are provided and both are immersed in the constant temperature bath 18. Each of capillaries 24 and 25 comprises a glass tubing about 1.5 inch long and having an I. D. of 0.0055 inch. Capillary vent 25 is closed by cap 26 in normal operation of the device, whereas the capillary vent 24 is open to the atmosphere. The details of construction and arrangement of these capillary vents are not necessary to the claimed invention but are described and claimed in co-pending application Serial Number 459,148, filed September 29, 1954, and entitled "Capillary Assemblies for Measurement," now U. S. Patent 2,769,336.

In a typical operation, the venting capillary 24 releases about 60 cc. of gases and air per minute. The amount of stripping in float chamber 20 which results from the venting of vapors is restricted by the capillary vent and when the venting is at a controlled and uniform rate of pressure record is obtained which is characteristic of the gasoline blend under test.

Since it is desirable to measure the absolute pressure within the float chamber 20 over a range which is remote from zero, I provide a reference bulb 34 which is connected to the reference side of the differential pressure-sensing element 27 by line 35. This pressure-indicating system does not form a part of the present invention but is described and claimed in co-pending application Serial Number 459,421, filed September 30 1954, and entitled "Measuring Pressures Remote From Zero."

With reference to the "158 point" section of the apparatus, the liquid gasoline is transferred by the second side 14a of the pump 15 through the check valve 16a as described above in connection with the first side 14 of the pump 15. The pump 15 is illustrated as being a double-acting pump of adjustable displacement of the Hills-McCanna type and the second side 14a is set to deliver about 40 cc. of liquid per minute which is passed via line 17a and preheater coil 31 and into the distillation chamber 20a. Boiling occurs in coil 31 which may be roughened inside by a light sandblasting. This minimizes pressure fluctuations due to poorly defined boiling which otherwise occurs in coil 31.

In flowing through the preheater coil 31, the fluid is raised to a temperature which is in substantial equilibrium with the temperature of the oil bath 18a which also contains the float chamber 20a. The temperature of the bath 18a is maintained at the selected elevated level by any conventional means such as described above and schematically represented in the drawing at 37.

The preheated sample fluid flows as a liquid and vapor from the preheater coil 31 into the distillation chamber 20a within which a constant level of sample liquid is maintained by float-controlled valve 21a, the excess liquid flowing from the chamber through the valve 21a and into outlet line 23a to joint sump 30.

Attached to the upper side of the float chamber 20a is a distillate capillary 32 which bleeds gasiform fluids from the distillation chamber 20a and which is immersed in the constant temperature bath 18a. This distillate capillary is preferably comprised of tubing of restricted diameter and of substantial length. For example, I have found that a suitable capillary 32 is comprised of aluminum tubing having an I. D. of 0.055, a length of about 9.5 feet coiled on a one inch diameter and on an axis of about 4 inches in length. Such a capillary vents about 0.1027 standard C. F. M.

Figure 2:
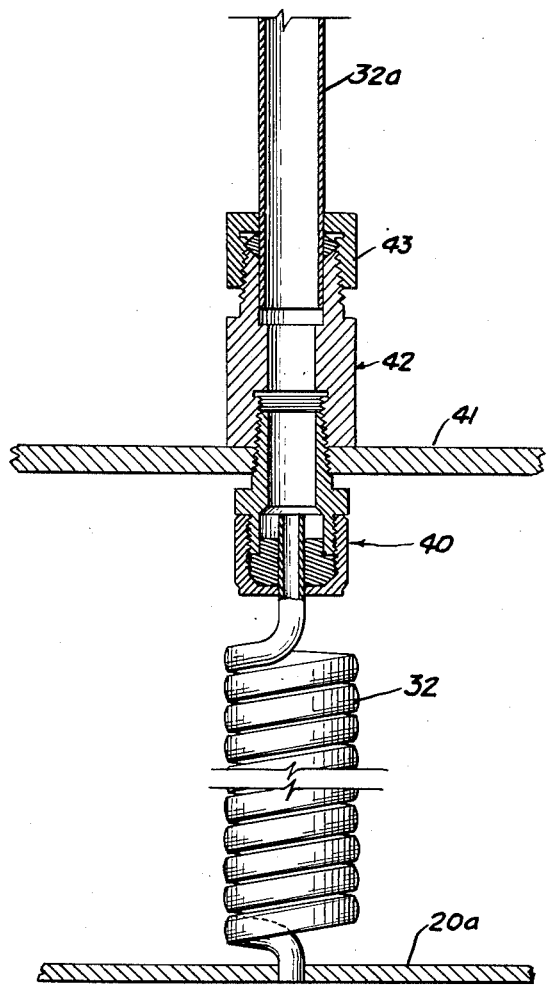
Figure 2 is an enlarged section illustrating a preferred distillate vent construction.

Referring to Figure 2, I have shown in some detail the construction of the distillate capillary 32 and its vent line 32a. The lower end of the capillary 32 communicates with the chamber 20a and the upper end passes into a flex fitting 40 which is threaded into the float mounting plate 41. A male ferrule 42 is threaded to the fitting 40 and receives the exhaust line 32a which may comprise a length of tubing substantially larger in diameter than the capillary 32, the length of which is carefully selected for this use.

The bath is maintained at a constant temperature and I have found that to correlate with the ASTM Test D86-52 the bath temperature should be about 195° F. to obtain an equivalent percent off at 158° F. by the ASTM method. It will be understood, however, that other bath temperatures can be selected to correspond to the temperature to which the percent off is related in any given test.

Figure 3:
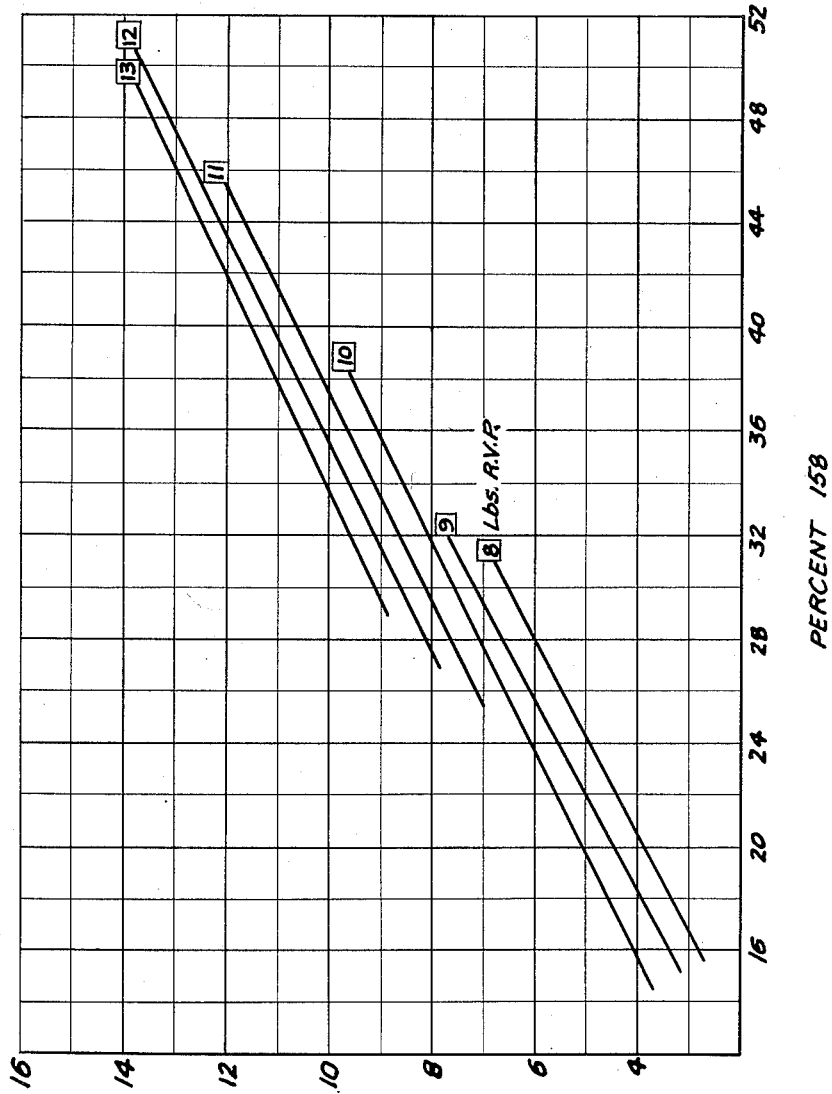
Figure 3 is a calibration curve which may be used in conjunction with the readings obtained on the distillation portion of the unit.

Extensive testing of my instrument has indicated that vapor pressure sensitivity can be controlled by suitable geometry of the venting capillary 32. Correction for any residual vapor pressure sensitivity can be achieved by the calibration chart shown in Figure 3 which reflects the effect of Reid vapor pressure on the recorder reading.

We prefer to employ a long capillary, tests having clearly demonstrated that a short capillary vent of about 3 inches, although passing the same amount of gas at 2 p. s. i. g. as a longer capillary vent of 9 feet, was sensitive to the vapor pressure of the gasoline under test. In other words, vapor pressure sensitivity is less with the long vent. Since an increase in bath temperature produces instrument results similar to an increase in volatility of the feed, abnormally high instrument readings are obtained with the short glass vent. However, I have found that with a long vent the instrument is less sensitive to bath temperature changes. Another advantage of the long vent is that at high gasoline volatilities better instrument readings are obtained.

Inasmuch as the determination of the "158 point" specification is sensitive to Reid vapor pressure, I have devised a combination instrument which gives automatically and continuously both the Reid vapor pressure and the "158 point" on aliquot portions of the same sample stream. The Reid vapor pressure reading, as indicated by the recorder 27, can be applied to the calibration chart of Figure 3 along with the recorder reading from 27a to give both of the specifications concurrently. This makes possible accurate and prompt control of the blending operations to give the blended gasoline having the selected Reid vapor pressure and "158 point" specifications. The apparatus schematically illustrated in Figure 1 makes this possible.

Although I have described my invention with reference to a preferred embodiment thereof, it should be understood that this is by way of illustration only. In any event, modifications in the apparatus and in the techniques employing the apparatus will become apparent to those skilled in the art from my description and such modifications can be made without departing from the spirit and scope of my invention.

What I claim is:

1. An apparatus for continuously determining a volatility characteristic of liquids which comprises in combination a distillation chamber means, means for continuously introducing a metered portion of liquid into said distillation chamber, means for maintaining in said chamber a pool of a uniform volume of liquid at a uniform depth, means for continuously maintaining said pool at a substantially constant temperature above about 150° F., capillary means for continuously venting distillate from said distillation chamber at the maintained temperature, means for removing liquid from the said chamber at a rate sufficient to maintain a constant depth of liquid in said pool, said capillary means comprising a tubing of restricted diameter and of such length as to be insensitive to vapor pressure, said capillary venting vapors at a rate of between 0.09 and about 0.12 standard cubic foot per minute when about 40 cc. of liquid gasoline per minute is supplied to said distillation chamber and when said chamber is maintained at a substantially constant temperature above about 150° F., and means connected to said chamber below the level of liquid therein for measuring the pressure exerted by the vapors on the pool of liquid in said chamber.

2. An apparatus for determining the percent off at 158° F. for blended gasolines as defined by ATSM Test D86–52 which comprises enclosed chamber means for maintaining a pool of constant volume of liquid gasoline at a constant depth, said enclosed chamber being of greater volume than said pool, means for maintaining the said pool at a substantially constant elevated temperature of above about 150° F., conduit means for continuously adding additional amounts of liquid gasoline to said pool at a substantially constant temperature corresponding to the temperature of the liquid in the pool, means for continuously removing liquid hydrocarbons from the pool at a rate sufficient to maintain said constant volume and depth of liquid in said pool, tube means for continuously venting a restricted stream of vapors from above said confined pool, said tube means comprising a tight coil of aluminum tubing having an I. D. of about 0.055 inch and a length of about 9.5 feet, and pressure-sensitive means communicating with said enclosed chamber below the level of liquid therein for determining the pressure on said liquid within said chamber.

3. An apparatus useful in determining volatility characteristics of hydrocarbons which comprises in combination means for continuously passing a sample stream through a heat exchanger maintained within a constant temperature bath for bringing said stream to a predetermined temperature above about 150° F., a distilling chamber in heat exchange relationship with said constant temperature bath, means for introducing said stream at said predetermined temperature into said distilling chamber, means for maintaining a substantially constant liquid level in said distilling chamber, tube means for withdrawing distilled vapors from said distilling chamber from above said liquid level through the capillary tube at a high rate but low enough to maintain a pressure in the distilling chamber which is proportional to the volatility characteristics of the liquid sample stream, said tube means comprising a tubing of restricted diameter and of such length as to be insensitive to vapor pressure, said capillary venting vapors at a rate of between about 0.09 and about 0.12 standard cubic foot per minute when about 40 cc. of liquid gasoline per minute is supplied to said distillation chamber and when said chamber is maintained at a substantially constant temperature above about 150° F., and means connected to said chamber below the liquid level therein for sensing the pressure exerted on the liquid in the distilling chamber.

4. An apparatus for determining the Reid vapor pressure and the percentage distilled under controlled temperature conditions for a gasoline sample, said apparatus comprising in combination a pair of similar constant temperature baths, a float-controlled chamber in each of said baths, pump means for flowing separate liquid streams in parallel to each of said chambers, a preheater coil in each of said baths interposed each of said chambers and said pump means, separate means for withdrawing liquid from each of said chambers, dual capillary vent means arranged in parallel and mounted on the first of said chambers, one of said dual capillary vents being provided with a removable sealing cap which is interchangeable with the other of said capillary vents, distillate conduit means providing a vent for the second of said chambers, said distillate conduit means being adapted to withdraw distillate vapors from said second chamber at a rate of between about 0.09 and about 0.12 standard cubic foot per minute when about 40 cc. of liquid gasoline per minute is supplied to said second chamber and when said second chamber is maintained at a substantially constant temperature above about 150° F. and separate pressure-transmitter means communicating with the liquid in each of said chambers.

5. A combination Reid vapor pressure and 158 point device comprising two parallel units each consisting essentially of (a) constant temperature bath means, (b) vented float chamber in said bath means, (c) pressure-sensing means, and (d) vent means connected to each of said chambers, means for maintaining the first of such baths at a constant temperature of about 140° F. means for maintaining the second of said baths at a temperature of about 195° F., the vent means for the first of said chambers comprising standard and operating capillaries in parallel, each of said capillaries comprising a glass tubing .0055 inch I. D. x 0.25 inch O. D. x 1.5 inch long, interchangeable removable caps for said capillaries, one of said caps having a vent channel discharging to the atmosphere, the vent means for the second of said chambers comprising a tightly coiled tubing about 9.5 feet in length and about 0.055 in. I. D., liquid supply conduit means, and pump means taking suction from said supply conduit means, said pump means delivering aliquot portions of the liquid flowing in said conduit means to each of the said vented float chambers.

6. The apparatus of claim 4 wherein the capillary vent means comprises a glass tubing having an inside diameter of .0055 inch and a length of about 1.5 inches.

7. An apparatus for continuously determining the percent distilled off at a selected elevated temperature according to ASTM Test D323–52 which comprises means for continuously supplying a flowing stream of liquid gasoline at a constant predetermined rate, means for passing said sample liquid stream through a heat exchange means above about 150° F., means for introducing said preheated liquid stream into a closed distillation chamber which is maintained at the constant temperature of the heat exchange means, means for maintaining a substantially constant liquid level in said distillation chamber including means for withdrawing liquid from said chamber, restricted tube means for withdrawing distillate vapors from said distillation chamber at a rate of about 0.1 standard cubic foot per minute, said tube means being further characterized by having such length as to be substantially insensitive to vapor pressure and by venting vapors at said rate when about 40 cc. of liquid gasoline per minute is supplied to distillation chamber maintain at a substantially constant temperature above about 150° F., and means for measuring the absolute pressure developed within said distillation chamber, said pressure being an indication of the percent off at the selected temperature according to ASTM Test D323–52.

8. An apparatus for continuously determining the percent gasoline distilled off at a selected elevated temperature according to ASTM D323–52 which comprises means for continuously supplying a flowing stream of liquid gasoline at a predetermined constant rate, a heat exchange means through which said flowing stream passes adapted to preheat said stream, means for introducing said preheated stream into a closed distillation chamber maintained at the constant temperature of said heat exchange means, means for maintaining a substantially constant liquid level in said distillation chamber including conduit means for withdrawing liquid therefrom, restricted tube means adapted to withdraw distillate vapors from said distillation chamber at a rate of between about 0.09 and about 0.12 standard cubic foot per minute when about 40 cc. of liquid gasoline per minute is supplied to said distillation chamber and when said distillation chamber is maintained at a constant temperature of about 195° F., said tube means comprising a tight coil of tubing having an I. D. of about 0.055 inch and a length of about 9.5 feet, and means for measuring the absolute pressure developed within said distillation chamber, said pressure being an indication of the percent off at the selected temperature according to ASTM Test D323–52.

References Cited in the file of this patent

UNITED STATES PATENTS

| | | |
|---|---|---|
| 2,002,101 | Valby et al. | May 21, 1935 |
| 2,119,786 | Kallam | June 7, 1938 |
| 2,674,881 | Rich | Apr. 13, 1954 |
| 2,722,826 | Milligan et al. | Nov. 8, 1955 |